Feb. 26, 1929.
G. H. HOLLOWAY
1,703,585
LOCOMOTIVE DRIVING BOX WEDGE ADJUSTER
Filed July 8, 1927
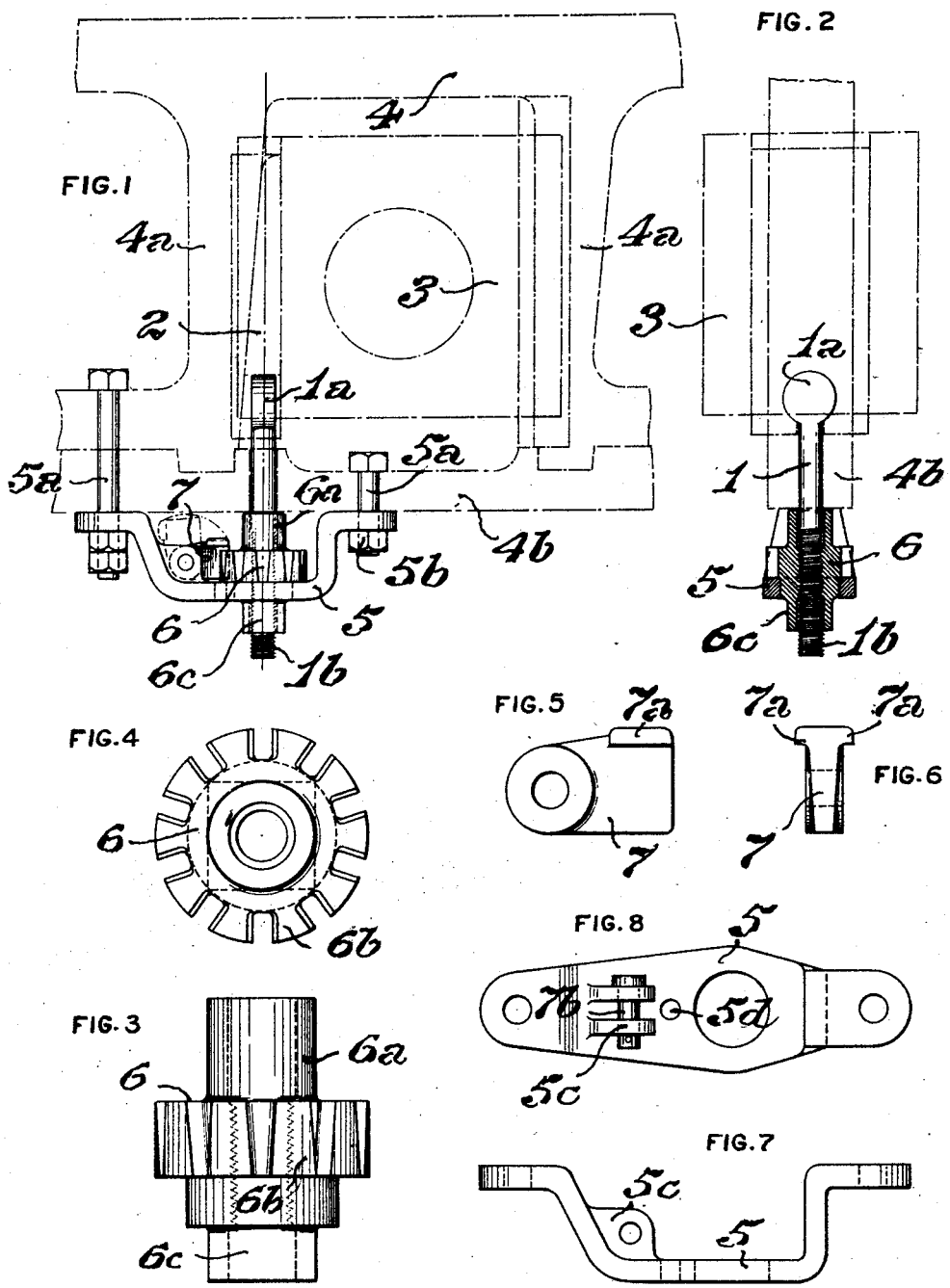

Patented Feb. 26, 1929.

1,703,585

UNITED STATES PATENT OFFICE.

GEORGE HENRY HOLLOWAY, OF MONTREAL, QUEBEC, CANADA.

LOCOMOTIVE-DRIVING-BOX WEDGE ADJUSTER.

Application filed July 8, 1927. Serial No. 204,156.

My invention relates to means for effecting the adjustment of the wedges of locomotive driving boxes, for the purpose of taking up wear between them and the pedestals in which they are fitted, and its object is to provide a mechanism of such type, which will be of simple and inexpensive construction, of ready applicability in connection with driving boxes of standard practice, and in the operation of which the adjustment of the wedges may be made with the certainty of positively locking them, and with an economy of time as compared with prior adjusting devices.

The improvement claimed is hereinafter fully set forth.

In the accompanying drawing: Figure 1 is a side view, in elevation, of a driving box wedge adjusting mechanism embodying my invention, illustrating its application in connection with a locomotive driving box and pedestal; Fig 2, an end view, partly in vertical section, of the same; Fig. 3, a side view, in elevation, and on an enlarged scale, of the adjusting nut; Fig. 4, a plan or top view thereof; Fig. 5, a side view, in elevation, of the locking dog; Fig. 6, an end view of the same; Fig. 7, a side view, in elevation, of the supporting bracket; and, Fig. 8, a plan or top view of the same.

In the practice of my invention, referring descriptively to the specific embodiment thereof which is herein exemplified, a wedge bolt, 1, is fitted in the wedge, 2, of a locomotive driving box, 3, which is interposed, in the usual manner, between two pedestal jaws, 4ª, of a locomotive frame, 4. A circular head, 1ª, which fits in a corresponding recess in the wedge, is formed on one end of the wedge bolt, 1, which passes freely through the wedge and through the pedestal cap, 4ᵇ, and has a screw thread, 1ᵇ, cut upon it, extending from its lower end, to or near the pedestal cap.

A supporting bracket, 5, is detachably connected to the pedestal cap, by bolts, 5ª, and nuts 5ᵇ.

A serrated adjusting nut, 6, engages the screw thread, 1ᵇ, of the wedge bolt, 1, said nut being seated, and bearing, on the supporting bracket, 5, and being held against longitudinal movement on the wedge bolt by being provided, at its top, with a tubular extension, 6ª, which bears against the bottom face of the pedestal cap. The sides of the teeth, 6ᵇ, of the nut are downwardly and outwardly tapered or inclined. A squared tubular extension, 6ᶜ, on the bottom of the adjusting nut, is adapted for the application of a wrench, for turning the nut, to effect the upward movement of the wedge bolt by which the wedge, 2, is tightened to take up wear between the driving box and the pedestal jaw.

The wedge is positively locked in adjusted position, by a locking dog, 7, having lugs, 7ª, on its top, which is pivoted to lugs, 5ᶜ, on the supporting bracket, by a bolt, 7ᵇ. The sides of the dog are reversely inclined to those of the teeth of the nut, and when the dog is engaged with the nut, its weight provides a positive lock, and prevents any movement of the nut about the axis of the wedge bolt. In order to provide for readily disengaging the hinged dog from the serrated nut, a perforation, 5ᵈ, is formed in the supporting bracket, through which a tool may be passed, to swing the dog on its pivot bolt, clear of the nut. The dog may also be disengaged from the nut by wedging a tool between the lugs, 7ª, on its top, and the top of the nut.

It is within the contemplation of the invention to form the bracket, 5, integral with the pedestal cap, 4ᵇ, in which case the extension, 6ª, should be separate from the adjusting nut, 6.

It will be seen that the mechanism of my invention is readily applicable in connection with the ordinary forms of driving boxes and the frame pedestals in which they are fitted, and that proper adjustment of driving boxes may be effected with an economy of time in the operation, and a positive lock be ensured for the wedge when adjusted.

I claim as my invention and desire to secure by Letters Patent:

1. In a locomotive driving box wedge adjusting mechanism, the combination, with a driving box wedge, of a non-rotatable wedge bolt, coupled to said wedge, and having a screw threaded lower portion, an adjusting nut having screw threads engaging the threads of the bolt, and locking teeth on its periphery; a pedestal cap; a bracket supporting said nut; and a member, movable to one position to engage the teeth on said nut and rigidly lock the nut against rotation, and to another position, out of engagement with said teeth, to release the nut for rotation.

2. In a locomotive driving box wedge adjusting mechanism, the combination, with a driving box wedge, of a wedge bolt, coupled to said wedge, and having a screw threaded lower portion, an adjusting nut having screw threads engaging the threads of the bolt; a bracket supporting said nut; and means, movable on a pivot, to one position, to engage and rigidly lock the nut against rotation, and to another position to release the nut for rotation.

3. In a locomotive driving box wedge adjusting mechanism, the combination, with a driving box wedge, a non-rotatable wedge bolt, coupled to said wedge, and having a screw threaded lower portion; a bracket having a seat for a nut; a nut supported on said seat; and having threads engaging the threads on the bolt, and a portion projecting below the seat adapted for engagement by a turning tool; and means, movable to one position to engage and rigidly lock the nut against rotation, and to another position to release the nut for rotation.

4. In a locomotive driving box wedge adjusting mechanism, the combination, with a driving box wedge, of a non-rotatable wedge bolt, coupled to said wedge; an adjusting nut, engaging said wedge bolt; a bracket, supporting said nut; and a locking dog, adapted to engage said nut.

5. In a locomotive driving box wedge adjusting mechanism, the combination, with a driving box wedge, and a locomotive frame pedestal cap, of a non-rotatable wedge bolt, coupled, at its upper end, to said wedge and having a screw threaded lower portion; a supporting bracket, depending from said pedestal cap; an adjusting nut, interposed between, and bearing on, said bracket and said pedestal cap; and a locking dog, adapted to engage said nut.

6. In a locomotive driving box wedge adjusting mechanism, the combination, with a driving box wedge, and a locomotive frame pedestal cap, of a wedge bolt, having a head articulated to said wedge, and a screw threaded lower portion; a supporting bracket, depending from said pedestal cap; an adjusting nut on the threaded portion of said bolt, and interposed between, and bearing on, said bracket and said pedestal cap, and having downwardly and outwardly tapering sided teeth; and a locking dog, having reversely tapered sides, said dog being adapted to be swung into, and out of, engagement with said nut.

GEORGE HENRY HOLLOWAY.